G. E. CAYLOR.
PNEUMATIC TIRE.
APPLICATION FILED JUNE 4, 1919. RENEWED AUG. 10, 1921.

1,404,685.

Patented Jan. 24, 1922.

Inventor:
Geo. E. Caylor
by E. W. Anderson Son
Attorneys.

UNITED STATES PATENT OFFICE.

GEORGE E. CAYLOR, OF DELAWARE, OHIO.

PNEUMATIC TIRE.

1,404,685.  Specification of Letters Patent.  Patented Jan. 24, 1922.

Application filed June 4, 1919, Serial No. 301,614. Renewed August 10, 1921. Serial No. 491,291.

*To all whom it may concern:*

Be it known that I, GEORGE E. CAYLOR, a citizen of the United States, resident of Delaware, in the county of Delaware and State of Ohio, have made a certain new and useful Invention in Pneumatic Tires; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to pneumatic tires for motor vehicles, having for its object to combine with the ordinary pneumatic tire, an improved spacing strip interposed between the inner tube and the casing whereby the inner tube is set inwardly or back closer to the rim of the wheel, said interposed spacing strip being of such nature as to add in itself increased elasticity, so that the tire as a whole approximates nearly the elasticity of the ordinary pneumatic tire, and yet punctures of the inner tube will rarely if ever occur. Other objects and advantages will hereinafter appear.

The invention consists in the novel construction and combinations of parts, as hereinafter set forth.

Figure 1:
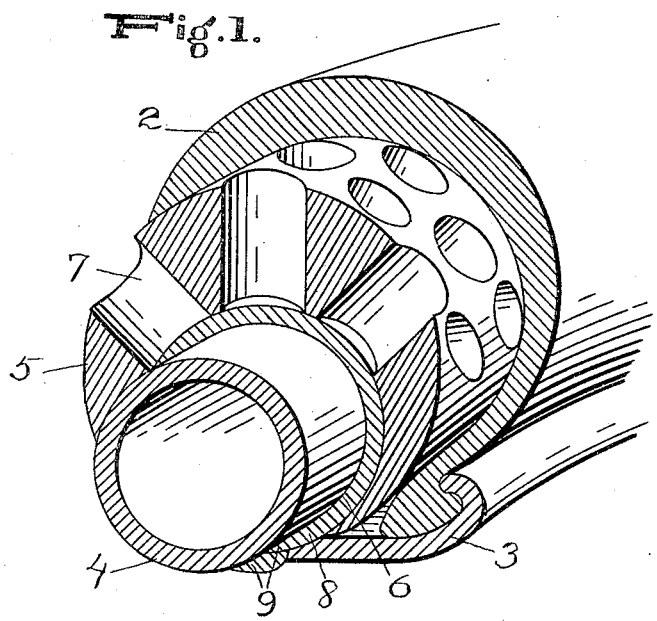
Figure 2:
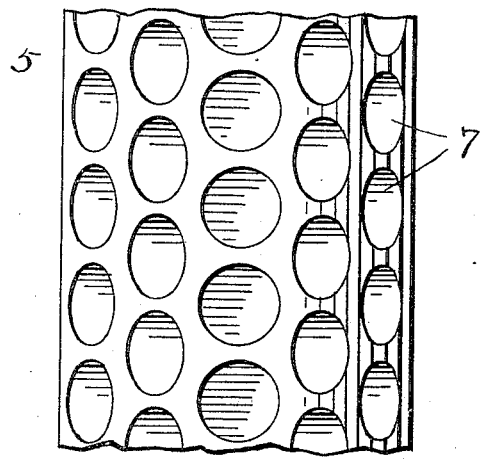

In the accompanying drawings illustrating the invention Figure 1 is a cross sectional perspective view of the invention, with the sections of the parts taken in different planes, and Figure 2 is a plan view of a portion of the spacing and armor strip. In these drawings the numeral 2 designates the ordinary casing of a pneumatic tire, and 3 the usual rim, 4 being the usual inner tube.

Interposed between the inner tube and the casing is the annular spacing strip 5, having therein at its inner side, an annular channel 6, wherein the inner tube is located, said spacing strip having tapered sides becoming gradually thinner and being designed to protect the inner tube at the outer or tread part and upon both sides.

The spacing strip is of rubber or rubber composition of a high degree of elasticity, and is provided with a plurality of series of perforations 7 of marked depth and cross sectional area, five series being shown, extending annularly therearound in the tread portion and sides thereof and staggered with relation to each other so that they are disposed close together in honeycomb fashion. These perforations open at their outer ends against the inner wall of the casing and open at their inner ends against the outer wall of a lining strip 8 of rubberized fabric and extending around between the spacing strip and the inner tube to protect the inner tube from becoming vulcanized to the spacing strip in use. Inasmuch as the casing and the lining strip 8 closely engage the spacing strip, the perforations 7 are effectually closed at both ends, being held closed through inflation of the inner tube which inflation may be to any desired degree or number of pounds pressure per square inch. Therefore when the tire is compressed under strain of the load, the spacing strip will be compressed and the air contained within the perforations or cells of said strip will be compressed, the air so compressed resisting collapse or give of the tire and causing it to stand up elastically very nearly if not quite as well as the usual pneumatic tire. At the same time nails, tacks or glass which may penetrate the casing, will have to also penetrate the spacing strip before they can reach the inner tube, said spacing strip being usually or preferably about twice the thickness of the casing and preventing punctures as stated without sacrifice of the elasticity of the tire, being also in the nature of an armor.

The spacing strip being of honeycomb cell nature will require a comparatively small amount of rubber for its manufacture, and the thickness thereof may be varied as desired, and the form, size and number of the perforations of said strip may also be varied as desired.

The spacing strip is split at its inner circumferential portion and is vulcanized to the lining 8, the latter having lapping inner marginal portions 9, fitting in the annular space between the flanges of the casing.

The tire can be put on or taken off the wheel as conveniently and quickly as can the ordinary pneumatic tire, and when in use the inner tube being inflated will give uniform pressure around the tire. The inner tube when inflated with the contained air at any desired degree of compression, will be of a diameter but slightly greater than one half the usual diameter as shown, so that its walls will be thicker and the rubber thereof will not be subject to the same strain, whereby said tube will last longer. The perforations 7 in some cases will be made so that they will not extend entirely through the spacing strip, the latter being thereby made stiffer to bear up better under the load as would be required in the case of trucks, for instance.

I claim:—

A pneumatic tire for motor vehicles, consisting of an outer casing, an inner pneumatic tube, a resilient spacing and armor strip of soft rubber interposed between the inner tube and the casing and of crescent form in cross section and having an annular channel of circular form in cross section inclosing said inner tube, said annulus having circumferential series of air cells closely distributed throughout the same and adapted to have the air contents thereof compressed under the load to effectually resist collapse and add to the resiliency of the tire, and an annular inner lining of rubberized fabric disposed between said inner tube and said spacing and armor strip for preventing vulcanization of the inner tube to said annulus.

In testimony whereof I affix my signature in presence of two witnesses.

GEORGE E. CAYLOR.

Witnesses:
C. A. MORRISON,
GEORGE M. ANDERSON.